(12) United States Patent
Honkanen et al.

(10) Patent No.: US 11,137,498 B2
(45) Date of Patent: *Oct. 5, 2021

(54) SCANNING RANGEFINDING SYSTEM WITH VARIABLE FIELD OF VIEW

(71) Applicant: Microvision, Inc., Redmond, WA (US)

(72) Inventors: Jari Honkanen, Monroe, WA (US); P. Selvan Viswanathan, Bellevue, WA (US); Robert James Jackson, Monroe, WA (US)

(73) Assignee: Microvision, Inc., Redmond, WA (US)

( * ) Notice: Subject to any disclaimer, the term of this patent is extended or adjusted under 35 U.S.C. 154(b) by 748 days.

This patent is subject to a terminal disclaimer.

(21) Appl. No.: 15/894,744

(22) Filed: Feb. 12, 2018

(65) Prior Publication Data

US 2019/0250273 A1 Aug. 15, 2019

(51) Int. Cl.
*G01S 17/89* (2020.01)
*G01S 17/08* (2006.01)
*G01S 7/481* (2006.01)

(52) U.S. Cl.
CPC ........... *G01S 17/89* (2013.01); *G01S 7/4817* (2013.01); *G01S 17/08* (2013.01); *G06T 2207/10028* (2013.01)

(58) Field of Classification Search
CPC .......... G01S 17/10; G01S 17/89; G01S 17/08; G01S 7/4817; G06T 2207/10028
USPC ......................................................... 356/4.01
See application file for complete search history.

(56) References Cited

U.S. PATENT DOCUMENTS

| | | | |
|---|---|---|---|
| 7,567,879 B2 | 7/2009 | Lewis et al. | |
| 7,857,460 B2* | 12/2010 | Klosowiak | G03B 21/28 353/69 |
| 2017/0176575 A1* | 6/2017 | Smits | G01S 7/484 |
| 2019/0154816 A1* | 5/2019 | Hughes | G05D 1/0061 |
| 2020/0344459 A1* | 10/2020 | Honkanen | G01S 17/42 |

* cited by examiner

*Primary Examiner* — Daniel L Murphy
(74) *Attorney, Agent, or Firm* — Kevin D. Wills (57) ABSTRACT

A scanning rangefinding system includes a MEMS device with a scanning mirror that sweeps a beam in two dimensions. Actuating circuits receive angular extents and offset information and provide signal stimulus to the MEMS device to control the amount and direction of mirror deflection on two axes. The scan angle and offset information may be modified to create a repeating pattern of different fields of view.

19 Claims, 11 Drawing Sheets

SCANNING RANGEFINDING SYSTEM WITH VARIABLE FIELD OF VIEW

FIELD

The present invention relates generally to rangefinding systems, and more specifically to scanning rangefinding systems.

BACKGROUND

Scanning rangefinding systems typically scan a pulsed light beam in a raster pattern in a field of view and measure times-of-flight (TOF) of received reflections. The spatial resolution of the resulting depth map is typically a function of the distance between the rangefinding system and the illuminated target features (reflection points) within the field of view, as well as the angular extents of the scanner deflection.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
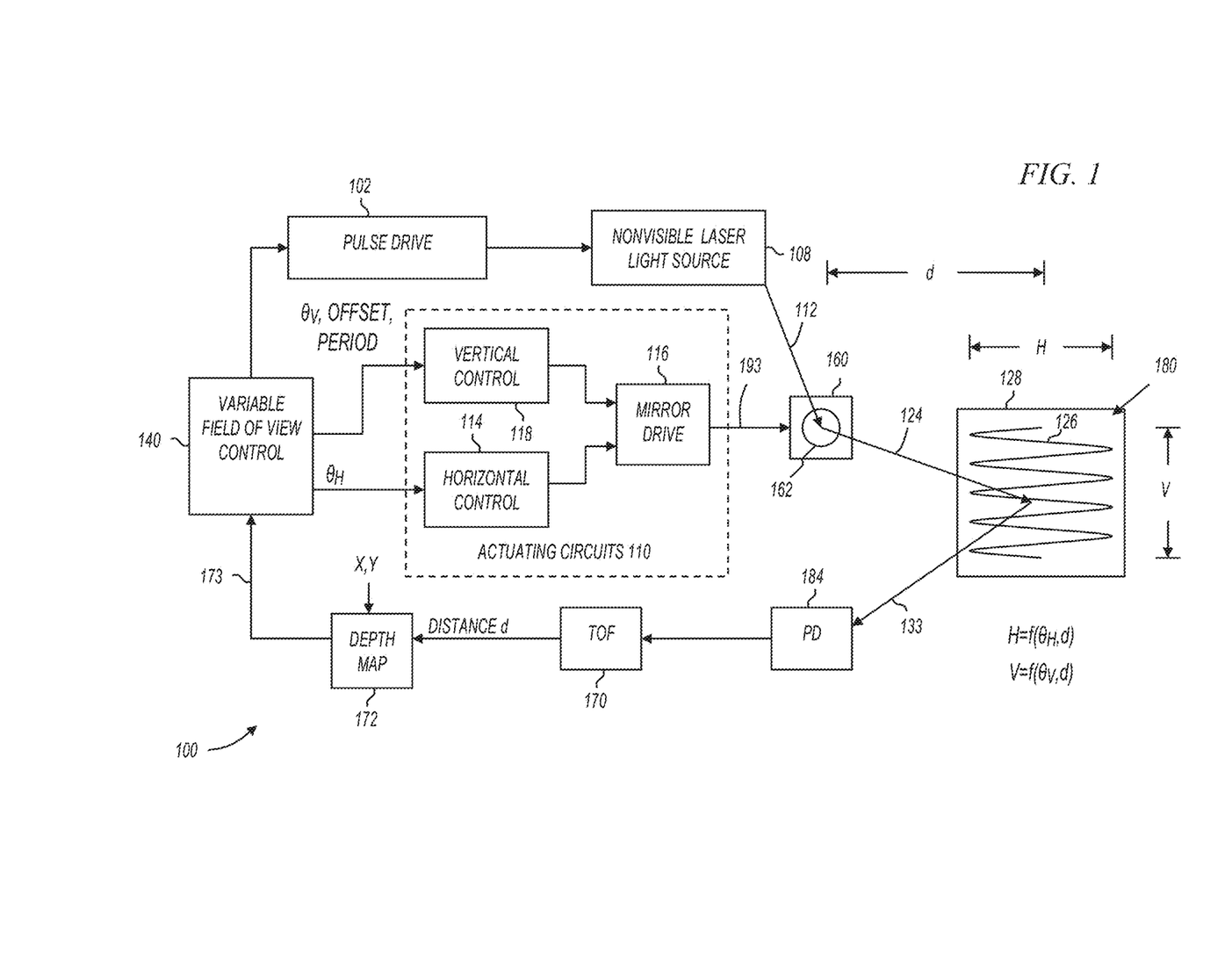
FIG. 1 shows a rangefinding system in accordance with various embodiments of the present invention.

FIG. 1 shows a scanning rangefinding system in accordance with various embodiments of the present invention. System 100 includes pulse drive circuit 102, nonvisible laser light source 108, microelectromechanical system (MEMS) device 160 having scanning mirror 162, and actuating circuits 110. Actuating circuits 110 include vertical control component 118, horizontal control component 114, and mirror drive component 116. System 100 also includes photodetector (PD) 184, time-of-flight (TOF) detection circuit 170, depth map storage circuit 172, and variable field of view controller 140.

Nonvisible laser light source 108 may be a laser light source such as a laser diode or the like, capable of emitting a laser beam 112. The beam 112 impinges on a scanning mirror 162 to generate a controlled output beam 124. In some embodiments, optical elements are included in the light path between light source 108 and mirror 162. For example, scanning rangefinding system 100 may include collimating lenses, dichroic mirrors, or any other suitable optical elements.

Actuating circuits 110 provide one or more drive signal(s) 193 to control the angular motion of scanning mirror 162 to cause output beam 124 to generate a raster scan 126 in a field of view 128. In operation, light source 108 produces light pulses and scanning mirror 162 reflects the light pulses as beam 124 traverses raster scan 126.

In some embodiments, raster scan 126 is formed by combining a sinusoidal component on the horizontal axis and a sawtooth component on the vertical axis. In these embodiments, controlled output beam 124 sweeps back and forth left-to-right in a sinusoidal pattern, and sweeps vertically (top-to-bottom) in a sawtooth pattern with the display blanked during flyback (bottom-to-top). FIG. 1 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the present invention are not limited by the waveforms used to control the vertical and horizontal sweep or the resulting raster pattern.

Pulse drive circuit 102 includes driver circuits that accept pulse power levels and pulse timing signals from variable field of view controller 140. Pulse drive circuit 102 produces current signals with appropriate power levels and timing to drive nonvisible laser light source and to produce laser light pulses scanned into a field of view. Examples of laser light pulses scanned into a field of view are described further below.

In some embodiments, nonvisible laser light source 108 sources nonvisible light such as infrared (IR) light. In these embodiments, PD 184 is able to detect the same wavelength of nonvisible light. For example, in some embodiments, laser light source 108 may be an IR laser diode that produces light with a wavelength of substantially 808 nanometers (nm). The wavelength of light is not a limitation of the present invention. Nonvisible laser light source 108 may produce any wavelength of nonvisible light without departing from the scope of the present invention. In some embodiments PD 184 may be implemented by a PIN photodiode, a Silicon photomultiplier (SiPM), or an avalanche photodiode (APD).

Although variable field of view of view controller 140 is shown driving nonvisible laser light source 108, this is not a limitation of the present invention. For example, in some embodiments, variable field of view controller 140 drives one or more visible laser light sources, and PD 184 is sensitive to the visible wavelengths used.

Time-of-flight (TOF) detection circuit 170 receives IR laser light pulses that are reflected off of objects in the field of view. The points in the field of view at which the light is reflected are referred to herein as "reflection points." A grouping of reflection points and their corresponding distances are referred to herein as a "depth map." TOF detection circuit 170 compares the timing of a received reflected IR pulse with timing of the IR pulse emitted from nonvisible laser light source 108 to determine the TOF of the IR pulse, thereby measuring the distance to the reflection point from which the IR light pulse reflected.

TOF detection circuit 170 may be implemented using any suitable circuits. For example, in some embodiments, TOF detection circuit 170 includes an analog integrator that is reset when the IR pulse is launched, and is stopped when the reflected pulse is received. TOF detection circuit 170 may also include an analog-to-digital converter to convert the analog integrator output to a digital value that corresponds to the time-of-flight (TOF) of the IR laser pulse, which in turn corresponds to the distance between system 100 and the reflection point from which the light pulse was reflected.

Depth map storage 172 receives distance data from TOF detection circuit 170 for various reflection points in the field of view defined by an X,Y pair and stores this data as a depth map. Depth map data is provided as a series of three-tuples (x,y,z) describing the location of reflection points in the field of view to variable field of view controller 140 at 173.

Depth map storage 172 may be implemented using any suitable circuit structure. For example, in some embodiments, depth map storage 172 is implemented in a dual port memory device that can be written on one port and read on a second port. In other embodiments, depth map storage 172 is implemented as data structures in a general purpose memory device. In still further embodiments, depth map storage 172 is implemented in an application specific integrated circuit (ASIC).

In operation, variable field of view controller 140 commands nonvisible laser light source 108 to emit nonvisible laser light pulses at one or more X,Y locations of raster scan 126 to measure the distance to one or more reflection points within the field of view, and then modifies the angular extents $\theta_H$ and $\theta_V$, offset, pulse power, and/or frame period to modify the field of view to accomplish various results.

Variable field of view controller 140 is implemented using functional circuits such as phase lock loops (PLLs), filters, adders, multipliers, registers, processors, memory, and the like. Accordingly, variable field of view controller 140 may be implemented in hardware, software, or in any combination. For example, in some embodiments, variable field of view controller 140 is implemented in an application specific integrated circuit (ASIC). Further, in some embodiments, some of the faster data path control is performed in an ASIC and overall control is software programmable.

MEMS device 160 is an example of a scanning mirror assembly that scans light in two dimensions. In some embodiments the scanning mirror assembly includes a single mirror that scans in two dimensions (e.g., on two axes). Alternatively, in some embodiments, MEMS device 160 may be an assembly that includes two scan mirrors, one that deflects the beam along one axis, and another that deflects the beam along a second axis largely perpendicular to the first axis.

The resultant field of view has a height (V) and a width (H) that are a function of the distance (d) from scanning mirror 162 to the point at which the height and width are measured, as well as the angular extents of mirror deflection. As used herein, the term "angular extents" refers to the total angle through which the mirror deflects rather than an instantaneous angular displacement of the mirror. The width (H) is a function of the distance (d) and the horizontal angular extents ($\theta_H$). This relationship is shown in FIG. 1 as $$H = f(\theta_H, d). \tag{1}$$

The height (V) is a function of the distance (d) and the vertical angular extents ($\theta_V$). This relationship is shown in FIG. 1 as $$V = f(\theta_V, d). \tag{2}$$

In various embodiments of the present invention, either or both of the vertical and horizontal scan angles are dynamically modified during operation of the scanning projection apparatus to modify the field of view. Also in some embodiments, an offset is applied to the vertical mirror displacement to dynamically modify the pointing angle of the field of view. Example results scanning nonvisible laser light pulses in different scan trajectories in different frames. Some embodiments alternate different fields of view from frame to frame, and some embodiments sweep through multiple different fields of view over multiple frames. Angular extents, offsets, pulse power, and frame periods may be modified from frame to frame in any combination to accomplish various results. Examples are described further below with reference to later figures.

As shown in FIG. 1, horizontal control component 114 receives a signal stimulus that represents the horizontal angular extents, and vertical control component 118 receives a signal stimulus that represents the vertical angular extents, offset, and frame period. The angular extents, offset, and frame period signal stimulus may be provided on multiple signal lines (e.g., dedicated signal lines, or a shared bus) or may be provided on a single signal line (e.g., a serial bus). The manner in which a signal stimulus is provided is not a limitation of the present invention.

Horizontal control component 114 and vertical control component 118 receive the signal stimulus and produce signals to effect actual mirror movement through the specified angles with the specified offset at the specified period. The signals produced by vertical control component 118 and horizontal control component 114 are combined by mirror drive component 116, which drives MEMS device 160 with a composite signal on node 193. In some embodiments that include two scan mirrors, MEMS device 160 is driven directly by signals produced by vertical control component 118 and horizontal control component 114.

Actuating circuits 110 are implemented using functional circuits such as voltage or current sources, op-amps, bridge circuits (and all in open or closed loop control with or without position sensing circuits), phase locked loops (PLLs), filters, adders, multipliers, registers, processors, memory, and the like. Accordingly, actuating circuits 110 may be implemented in hardware, software, or in any combination. For example, in some embodiments, actuating circuits 110 are implemented in an application specific integrated circuit (ASIC). Further, in some embodiments, some of the faster data path control is performed in an ASIC and overall control is software programmable.

The horizontal and vertical angular extents and offset are controlled by variable field of view controller 140. In operation, variable field of view controller 140 may dynamically modify the angular extents of mirror deflection in a fixed or variable pattern in a pre-programmed sequence or in response to distance information received from TOF detection circuit 170. For example, in some embodiments, variable field of view controller 140 may modify the field of view from frame to frame in a sequence that does not change. Also for example, in some embodiments, variable field of view controller 140 may modify the field of view from frame to frame based on objects detected in the field of view.

Figure 2:
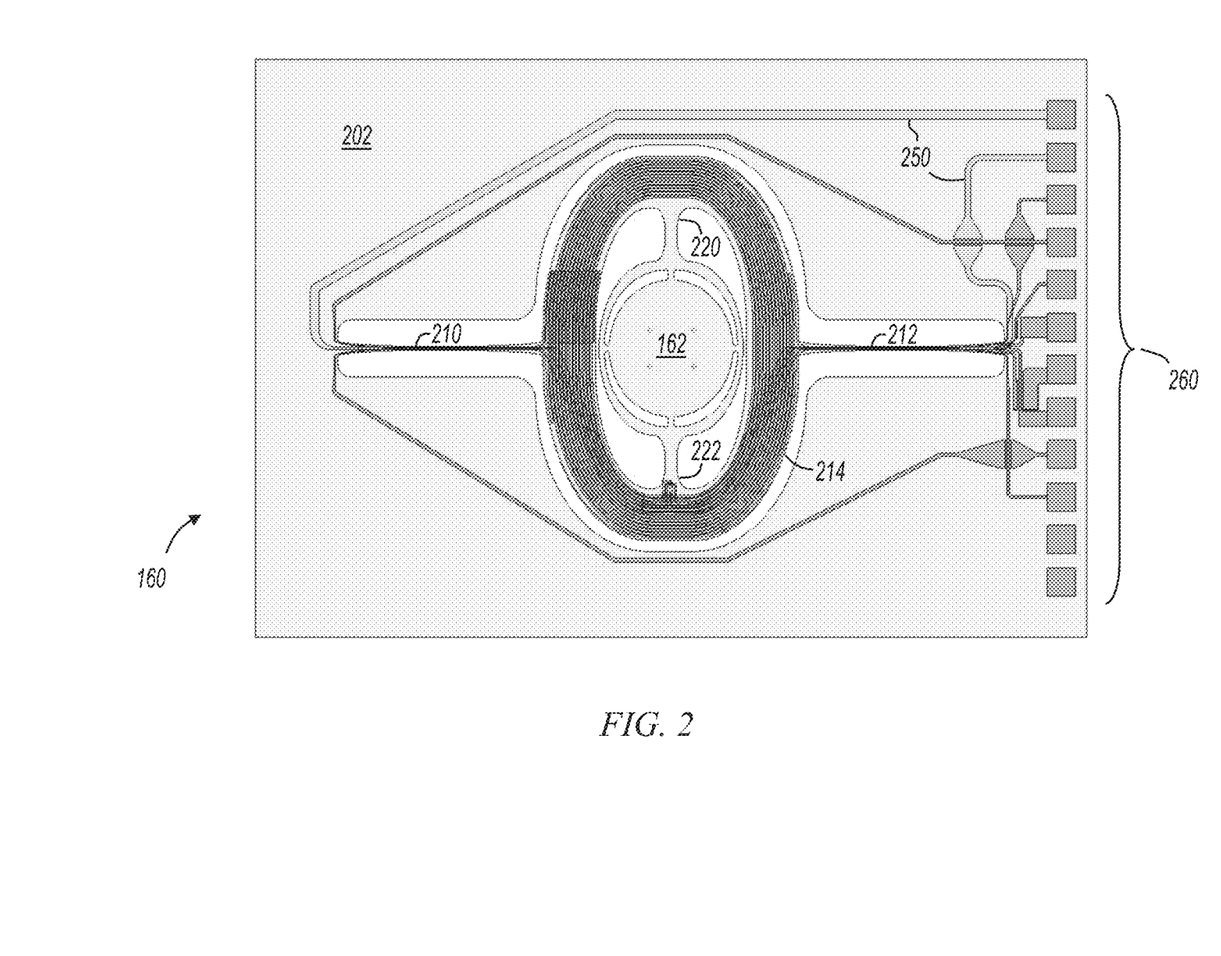
FIG. 2 shows a plan view of a microelectromechanical system (MEMS) device with a scanning mirror.

FIG. 2 shows a plan view of a microelectromechanical system (MEMS) device with a scanning mirror. MEMS device 160 includes fixed platform 202, scanning platform 214 and scanning mirror 162. Scanning platform 214 is coupled to fixed platform 202 by flexures 210 and 212, and scanning mirror 162 is coupled to scanning platform 214 by flexures 220 and 222. Scanning platform 214 has a drive coil connected to drive lines 250, which are driven by a composite signal provided on node 193 from actuating circuits 110 (FIG. 1). Current driven into drive lines 250 produces a current in the drive coil. Two of the interconnects 260 are coupled to drive lines 250.

In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 214, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The long axis of flexures 210 and 212 form a pivot axis. Flexures 210 and 212 are flexible members that undergo a torsional flexure, thereby allowing scanning platform 214 to rotate on the pivot axis and have an angular displacement relative to fixed platform 202. Flexures 210 and 212 are not limited to torsional embodiments as shown in FIG. 2. For example, in some embodiments, flexures 210 and 212 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

Mirror 162 pivots on a first axis formed by flexures 220 and 222, and pivots on a second axis formed by flexures 210 and 212. The first axis is referred to herein the horizontal axis, and the second axis is referred to herein as the vertical axis. The distinction between vertical and horizontal is somewhat arbitrary, since a rotation of the display system will cause a rotation of the two axes. Accordingly, the various embodiments of the present invention are not to be limited by the terms "horizontal" and "vertical."

In some embodiments, scanning mirror 162 scans at a mechanically resonant frequency on the horizontal axis resulting in a sinusoidal horizontal sweep. Further, in some embodiments, scanning mirror 162 scans vertically at a nonresonant frequency, so the vertical scan frequency can be controlled independently.

In various embodiments of the present invention, the angular extents and/or offsets of mirror deflection of mirror 162 are modified during operation. For example, the horizontal angular extents may be modified, the vertical angular extents or offset may be modified, or all may be modified. The angular extents and offset may be controlled and modified by signal stimulus received on drive lines 250. This signal stimulus is provided on node 193 by actuating circuits 110 (FIG. 1).

The particular MEMS device embodiment shown in FIG. 2 is provided as an example, and the various embodiments of the invention are not limited to this specific implementation. For example, any scanning mirror capable of sweeping in two dimensions to reflect a light beam in a raster pattern may be incorporated without departing from the scope of the present invention. Also for example, any combination of scanning mirrors (e.g., two mirrors: one for each axis) may be utilized to reflect a light beam in a raster pattern. Further, any type of mirror drive mechanism may be utilized without departing from the scope of the present invention. For example, although MEMS device 160 uses a drive coil on a moving platform with a static magnetic field, other embodiments may include a magnet on a moving platform with drive coil on a fixed platform. Further, the mirror drive mechanism may include an electrostatic drive mechanism.

Figure 3:
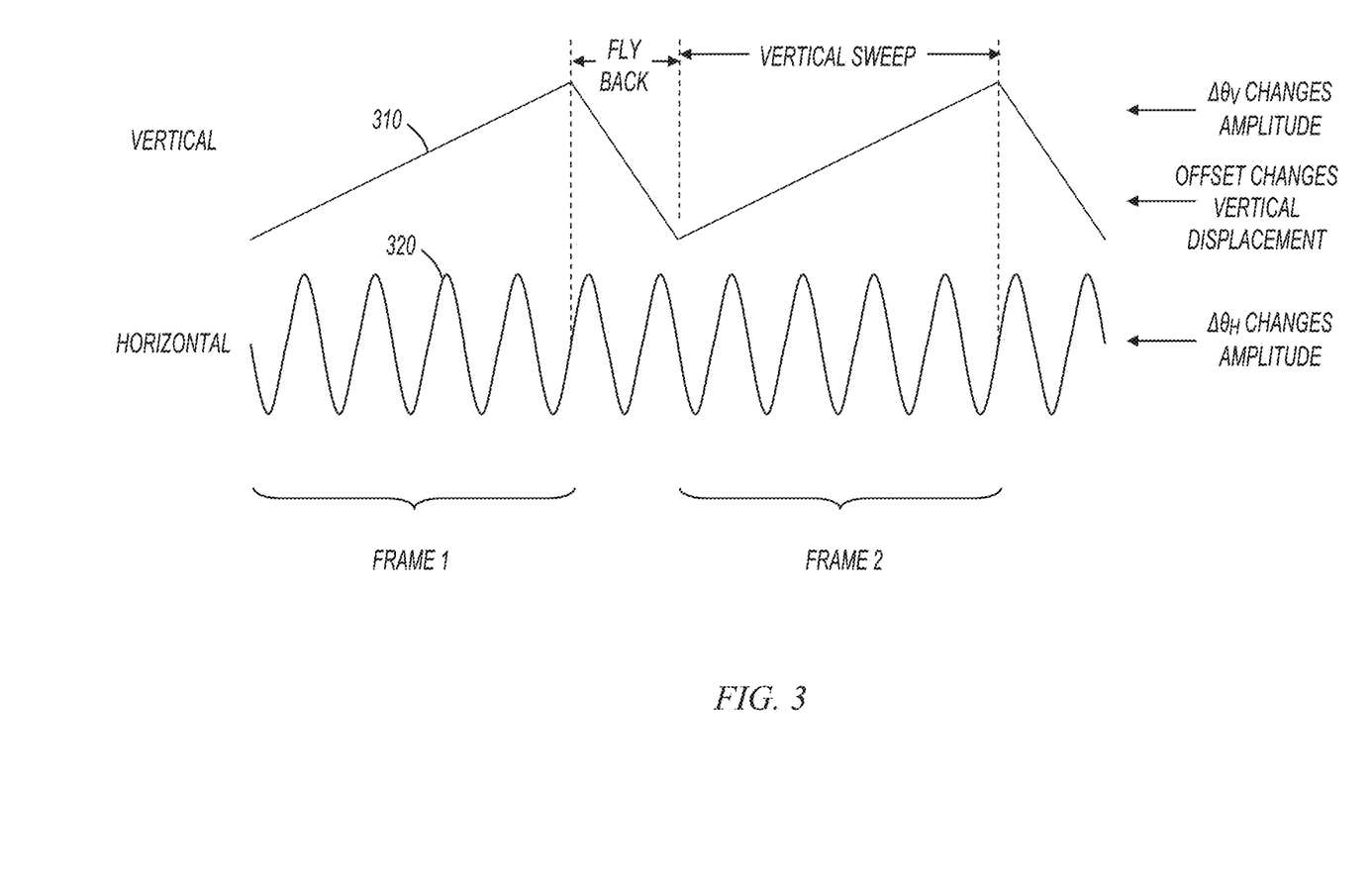
FIG. 3 shows deflection waveforms resulting from a linear vertical sweep and a sinusoidal horizontal sweep.

FIG. 3 shows example waveforms suitable for the operation of the scanning rangefinding system of FIG. 1. Vertical deflection waveform 310 is a sawtooth waveform, and horizontal deflection waveform 320 is a sinusoidal waveform. FIG. 3 shows deflection for two frames. As used herein, the term "frame" refers to a time period in which one vertical sweep, and therefore one scan trajectory, takes place. In the example of FIG. 3, the scan trajectories in FRAME 1 and FRAME 2 are the same, resulting in the same field of view in both frames.

Deflection of mirror 162 according to waveforms 310 and 320 may be achieved by driving MEMS device 160 with the appropriate drive signals. In some embodiments, the horizontal deflection frequency is at a resonant frequency of the mirror and a very small excitation at that frequency will result in the desired angular extents. A sawtooth drive signal for the vertical deflection may be derived from a sum of sine waves at various frequencies. The drive signal for the vertical deflection may also be derived from specific points programmed into a waveform generator.

Although a sawtooth drive signal will result in the vertical deflection shown in FIG. 3, other drive signal embodiments exist. For example, in some embodiments, the vertical drive signal may be a triangle wave (where subsequent frames are written top to bottom followed by bottom to top alternating each frame) or sinusoidal waveforms. The vertical drive signal may also be other non-linear ramp waveform shapes, for example ones that result in parabolic or hyperbolic non-constant mirror velocity profiles.

Sawtooth vertical deflection waveform 310 includes vertical sweep portions and flyback portions. In some embodiments, laser light pulses are emitted during the vertical sweep portions, and not during the flyback portions. The flyback portions correspond to the beam "flying back" to the top of the field of view.

For clarity of explanation, FIG. 3 shows only a few horizontal cycles per vertical sweep. In practice, many more horizontal cycles are present. For example, a horizontal resonant frequency of 24.5 kHz and a frame rate of 60 Hz will yield about 408 horizontal cycles per vertical sweep. In some embodiments, the frame rate is variable from frame to frame, and the number of horizontal cycles per vertical sweep is also variable from frame to frame. In these embodiments, the field of view may remain constant, while the number of horizontal cycles in the field of view increases.

The amplitude of horizontal deflection waveform 320 corresponds to the horizontal angular extent of mirror deflection. As the amplitude increases, the angular extent of mirror deflection also increases. Referring now back to FIG. 1, as $\theta_H$ increases, actuating circuits 110 provide stimulus to MEMS 160 that causes the amplitude of horizontal deflection waveform 320 to increase. Stated generally, a change in $\theta_H$ ($\Delta\theta_H$) results in a change in the amplitude of the horizontal deflection waveform 320. Similarly, the amplitude of vertical deflection waveform 310 corresponds to the vertical angular extent of mirror deflection. As the amplitude increases, the angular extent of mirror deflection also increases. Referring now back to FIG. 1, as $\theta_V$ increases, actuating circuits 110 provide stimulus to MEMS 160 that causes the amplitude of vertical deflection waveform 310 to increase. Stated generally, a change in $\theta_V$ ($\Delta\theta_V$) results in a change in the amplitude of the vertical deflection waveform 310. The vertical displacement of waveform 310 corresponds to the offset provided by variable field of view controller 140. Referring now back to FIG. 1, as the value of the offset increases, the vertical displacement of waveform 310, and the field of view in space, increases.

Figure 4:
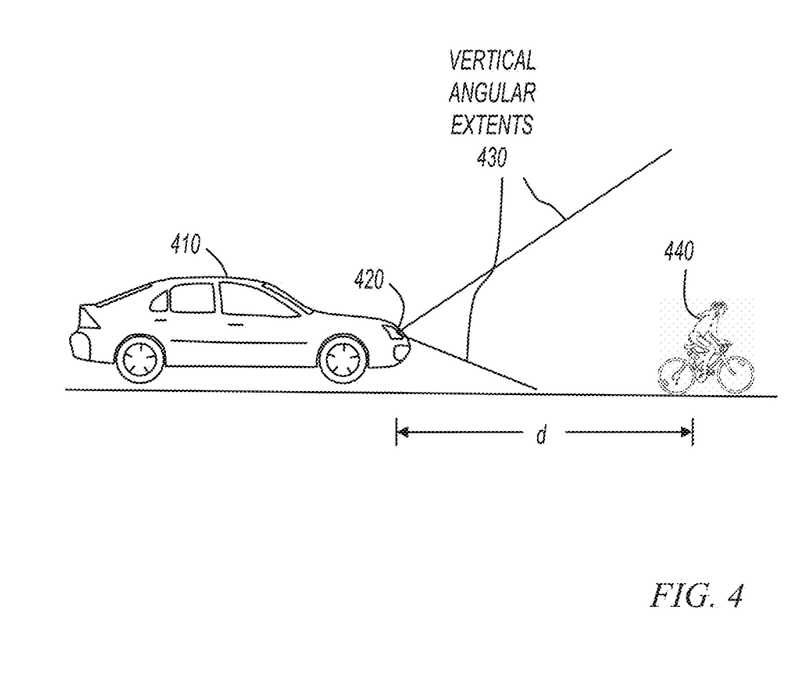
FIGS. 4 and 5 show operation of a rangefinding system in accordance with the deflection waveforms shown in FIG. 3.
Figure 5:
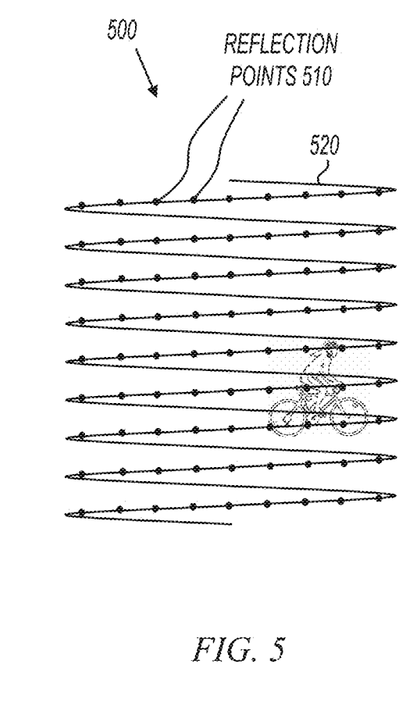

FIGS. 4 and 5 show operation of a rangefinding system in accordance with the deflection waveforms shown in FIG. 3. FIG. 4 shows automobile 410 having scanning rangefinding system 420 with vertical angular extents 430 that result from waveform 310 as shown in FIG. 3. The resulting field of view 500 is shown in FIG. 5. Field of view 500 has reflection points 510 shown on the scanning trajectory 520. The reflection points shown in FIG. 5 are only present on scans that move from right to left, although this is not a limitation of the present invention. For example, in some embodiments, reflection points may be present on scans that move from left to right, and in other embodiments, reflection points are present on scans that move in both directions.

Scanning rangefinding system 420 may be any scanning rangefinding system described herein. For example, in some embodiments, scanning rangefinding system 420 includes scanning rangefinding system 100 (FIG. 1).

FIGS. 4 and 5 also show object 440 in the field of view. In this example, object 440 is a bicyclist; however, scanning rangefinding system 420 will detect any object that reflects laser light within the field of view.

In the examples of FIGS. 4 and 5, the field of view 500 is constant from frame to frame because the angular extents and offset are also constant frame to frame. This corresponds to scanning rangefinding system operation in accordance with vertical displacement waveform 310 shown in FIG. 3. The number of reflection points that fall on object 440 in field of view 500 is a function of the vertical angular extents 430 and the distance d. For example, for any given distance d, larger vertical angular extents will result in fewer reflection points falling on object 440. Likewise, for any given distance d, smaller vertical angular extents 430 will result in an increased number of reflection points 510 falling on object 440.

In some embodiments the frame rate is decreased and the frame period is increased, thereby resulting in an increased number of horizontal scans in each frame. This results in an increased number of reflection points falling on object 440. In various embodiments of the present invention, vertical angular extents are modified, the offsets are modified and periods are modified to change the number of reflection points that fall on any given object in the field of view.

Figure 6:
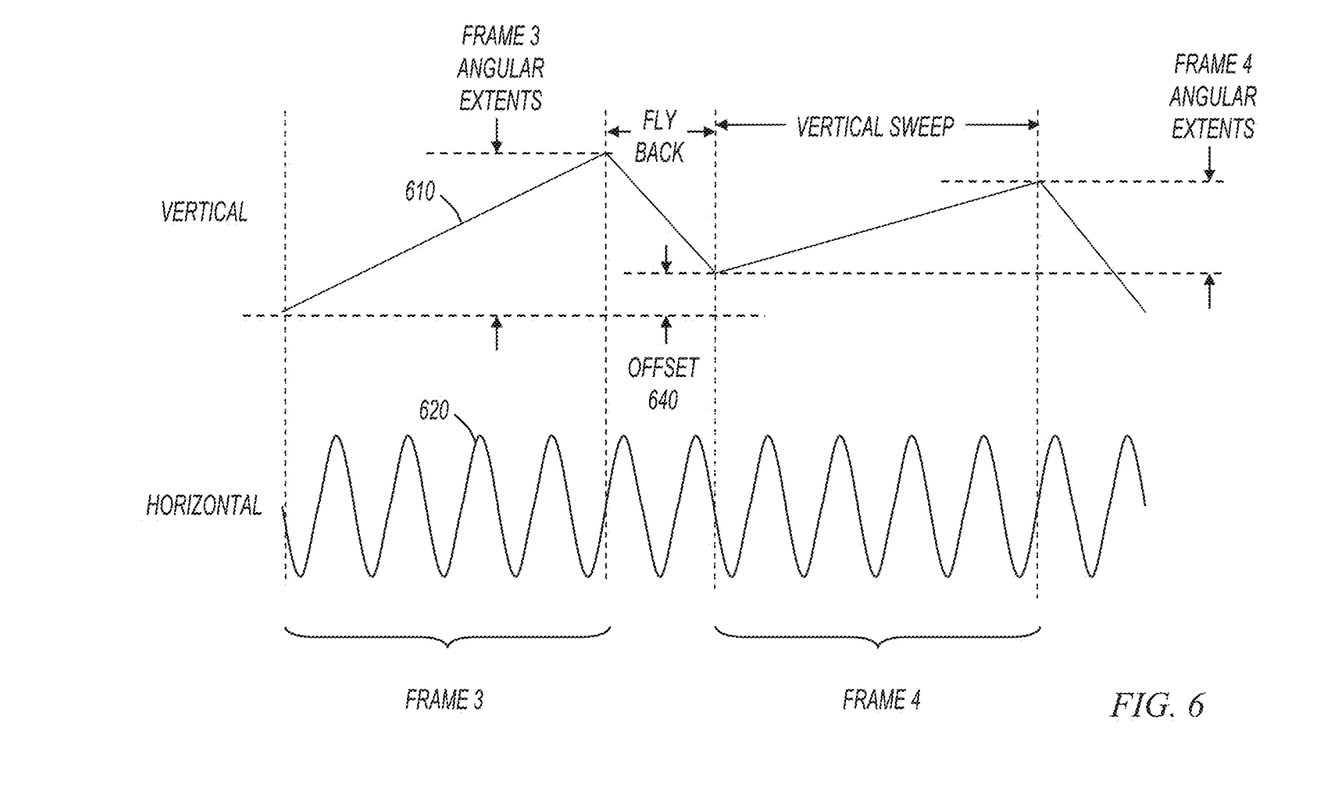
FIG. 6 shows deflection waveforms resulting from a vertical sweep that is different frame to frame.

FIG. 6 shows deflection waveforms resulting from a vertical sweep that is different frame to frame. The waveforms shown in FIG. 6 represent an example of dynamic modification of vertical angular extents and vertical offset of mirror deflection to modify the field of view. Waveform 610 represents the deflection of the scanning mirror on the vertical axis, and waveform 620 represents the deflection of the scanning mirror on the horizontal axis. Waveforms 610 and 620 are similar to waveforms 310 and 320 (FIG. 3) during FRAME 3, but are modified in FRAME 4 to create a different field of view.

The FRAME 3 vertical angular extents shown in FIG. 6 are the same as the FRAME 1 vertical angular extents shown in FIG. 3; however, the FRAME 4 angular extents shown in FIG. 6 are reduced as compared to the FRAME 2 angular extents shown in FIG. 3. In addition, an offset 640 is introduced in FRAME 4 as shown in FIG. 6. As an example and based on the MEMS and drive technology, this offset 640 may be applied as a vertical offset to one of the mirrors in the system or as a resting point bias in a single mirror system. The resulting change in the field of view is illustrated in FIGS. 7 and 8.

Figure 7:
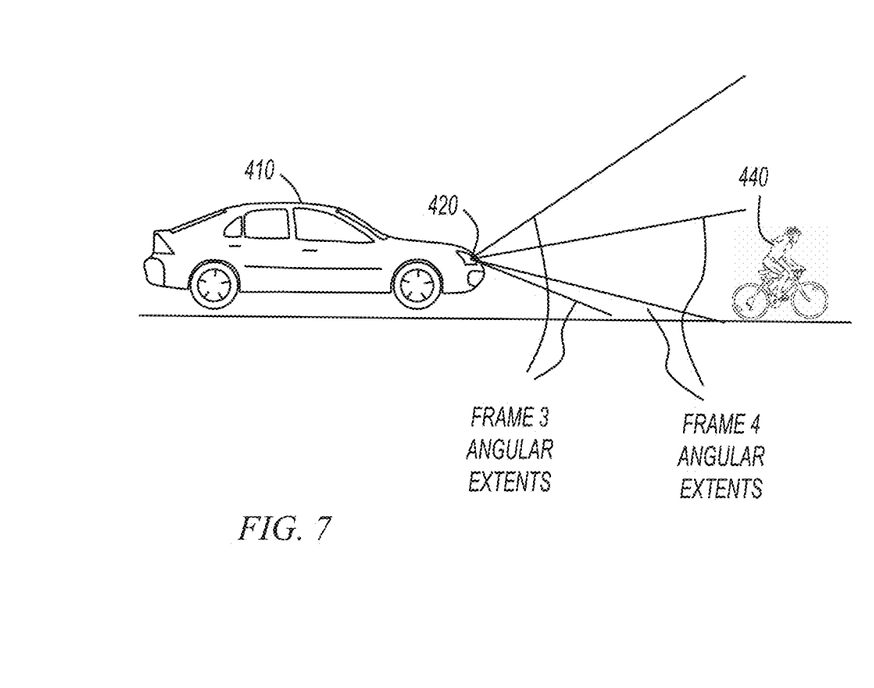
FIGS. 7 and 8 show operation of a rangefinding system in accordance with the deflection waveforms shown in FIG. 6.
Figure 8:
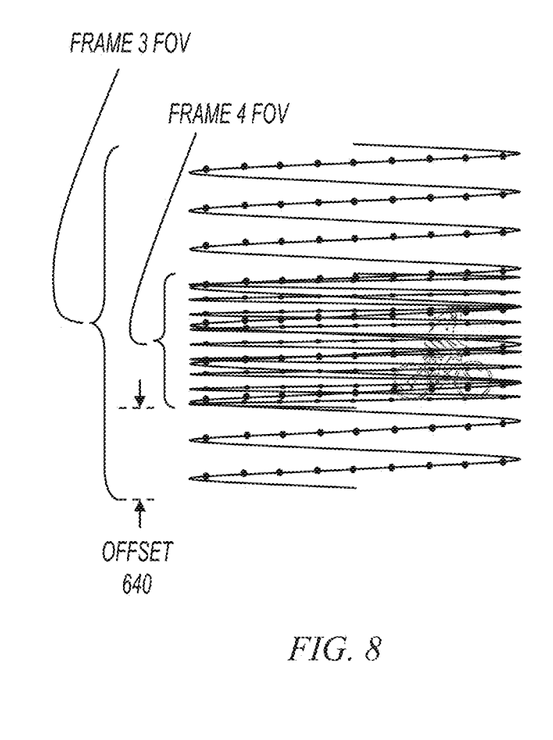

FIGS. 7 and 8 show operation of a rangefinding system in accordance with the deflection waveforms shown in FIG. 6. FIG. 7 shows automobile 410 with scanning rangefinding system 420. In the example of FIG. 7, scanning rangefinding system 420 is operating in accordance with the deflection waveforms of FIG. 6. For example, the FRAME 3 vertical angular extents are shown having the same angles as FRAME 1 shown in FIG. 4, but the FRAME 4 vertical angular extents are smaller than the same angles in FRAME 2. In addition, a vertical offset 640 is introduced as shown in FIG. 6.

FIG. 8 shows the fields of view (FOV) for FRAME 3 and FRAME 4 resulting from the deflection waveforms shown in FIG. 6. As a result of the smaller vertical angular extents and the vertical offset introduced in FRAME 4, the FRAME 4 FOV has an increased density of reflection pints in the vicinity of object 440.

In some embodiments, the angular extents and offsets corresponding to FRAME 3 and FRAME 4 alternate from frame to frame. In these embodiments, every other frame has the field of view corresponding to FRAME 3 and every other frame has the field of view corresponding to FRAME 4. In other embodiments, fields of view form a repeating pattern after three or more frames. For example, the angular extents and/or offset may cycle through three or more values in successive frames before repeating. In still further embodiments, the vertical offset value may sweep through a series of values in successive frames such that every other frame has smaller angular extents with a different offset. In these embodiments, every other frame has a fixed large field of view, and every other frame has a smaller field of view with a different offset.

Figure 9:
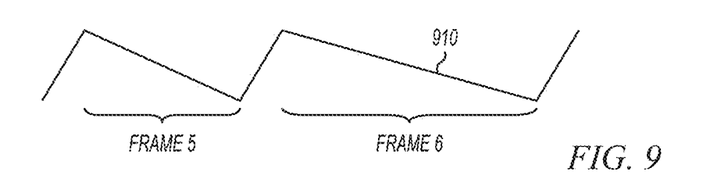
FIG. 9 shows a vertical deflection waveform resulting from a vertical sweep having a different period frame to frame.

FIG. 9 shows a vertical deflection waveform resulting from a vertical sweep having a different period frame to frame. Vertical deflection waveform 910 represents the deflection of the scanning mirror on the vertical axis for two frames. FRAME 5 has a first period and FRAME 6 has a second period. The horizontal deflection waveform (not shown) is the same as the examples shown in FIGS. 3 and 6. Because the horizontal sweep period is constant, the increased vertical sweep period corresponding to FRAME 6 in FIG. 9 results in an increased number of horizontal sweeps per frame, and a corresponding increase in the density of reflection points in the field of view. This is shown in FIG. 10.

Figure 10:
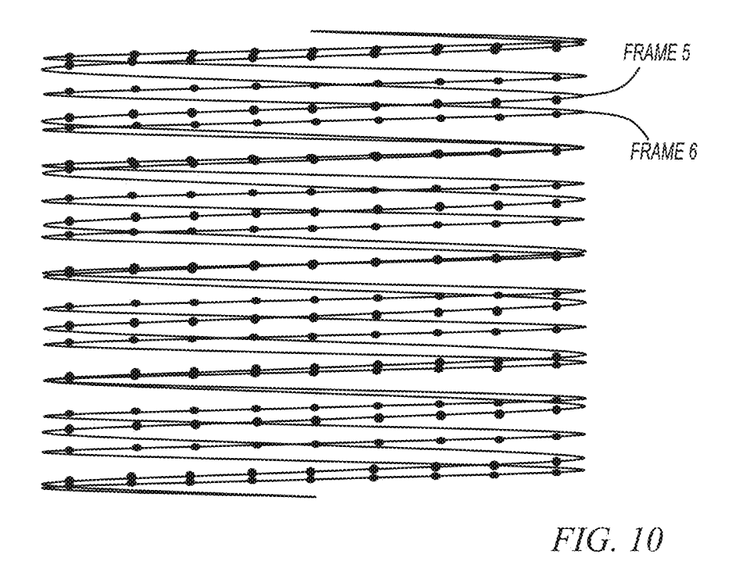
FIG. 10 shows operation of a rangefinding system in accordance with the deflection waveforms shown in FIG. 9.

FIG. 10 shows operation of a rangefinding system in accordance with the deflection waveforms shown in FIG. 9. The scan trajectories for FRAME 5 and FRAME 6 are shown, where FRAME 6 has an increased number of horizontal sweeps and an increased number of reflection points.

In some embodiments, the field of view, frame period, and/or pulse power levels are dynamically modified based on information in the depth map. For example, variable field of view controller 140 may modify the angular extents, offset, period, and/or power level based on the detection of objects in the field of view. In the example of FIGS. 7 and 8, scanning rangefinding system 420 may detect object 440 in the field of view, and then modify the angular extents and offset to increase the depth map resolution in the vicinity of object 440. In the example of FIGS. 9 and 10, a scanning rangefinding system may detect an object in the field of view, and then modify the frame period to increase the depth map resolution in the field of view. In still further examples, the scanning rangefinding apparatus may increase or decrease laser pulse power levels based on a distance, size, or other characteristic of an object detected in the field of view.

Figure 11:
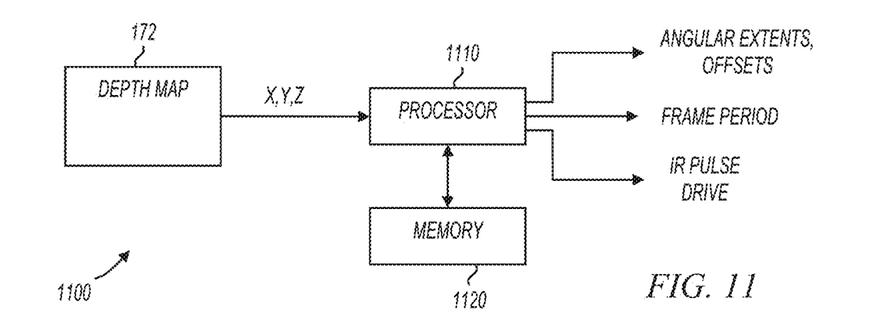
FIG. 11 shows a variable field of view controller in accordance with various embodiments of the present invention.

FIG. 11 shows a variable field of view controller in accordance with various embodiments of the present invention. Controller 1100 is an example implementation of variable field of view controller 140 (FIG. 1). Controller 1100 includes depth map 172, processor 1110, and memory 1120. Memory 1120 represents a non-transitory computer-readable medium that stores instructions. When the instructions are executed by processor 1110, processor 1110 may perform one or more methods corresponding to object detection, angular extents determination, offset determination, pulse power determination, and/or frame period determination.

Figure 12:
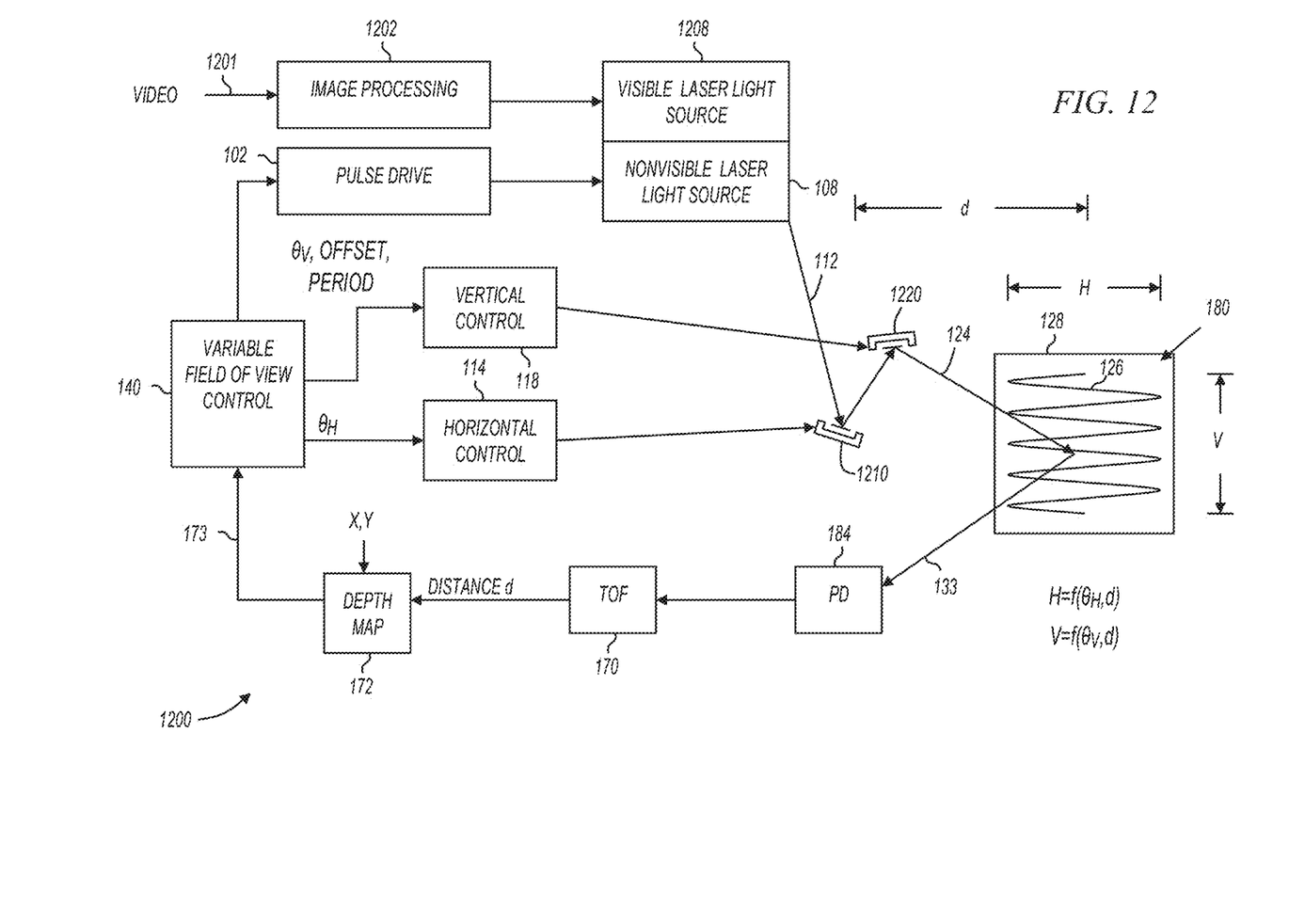
FIG. 12 shows a scanning rangefinding system in accordance with various embodiments of the present invention.

FIG. 12 shows a scanning rangefinding system in accordance with various embodiments of the present invention. Scanning rangefinding system 1200 includes pulse drive 102, nonvisible laser light source 108, PD 184, TOF detection circuit 170, depth map 172, variable field of view controller 140, vertical control component 118, and horizontal control component 114, all of which are described above with reference to previous figures. Scanning rangefinding system 1200 also includes image processing component 1202, visible laser light source 1208, and scanning mirrors 1220 and 1210.

Scanning rangefinding system 1200 combines the variable field of view rangefinding functionality described above with scanning projection functionality. In operation, image processing component 1202 receives video data on node 1201 and produces display pixel data to drive visible laser light source 1208 when pixels are to be displayed. Visible laser light source 1208 receives display pixel data and produces light having grayscale values in response thereto. Visible laser light source 1208 may be monochrome or may include multiple different color light sources. For example, in some embodiments, visible laser light source 1208 includes red, green, and blue light sources. In these embodiments, image processing component 1202 outputs display pixel data corresponding to each of the red, green, and blue light sources.

The video data 1201 represents image source data that is typically received with pixel data on a rectilinear grid, but this is not essential. For example, video data 1201 may represent a grid of pixels at any resolution (e.g., 640×480, 848×480, 1920×1080). Scanning rangefinding system 1200 includes a scanning projector that scans a raster pattern. The raster pattern does not necessarily align with the rectilinear grid in the image source data, and image processing component 1202 operates to produce display pixel data that will be displayed at appropriate points on the raster pattern. For example, in some embodiments, image processing component 1202 interpolates vertically and/or horizontally between pixels in the source image data to determine display pixel values along the scan trajectory of the raster pattern.

Scanning mirrors 1210 and 1220 each scan on one axis. For example, scanning mirror 1210 scans on the horizontal axis and scanning mirror scans on the vertical axis. Horizontal control component 114 provides signal stimulus to excite movement of scanning mirror 1210 and horizontal control component 118 provides signal stimulus to excite movement of scanning mirror 1220.

Some embodiments include scanning projection functionality with two scanning mirrors as shown in FIG. 12, and some embodiments include scanning projection functionality with a single scanning mirror such as scanning mirror 162 (FIG. 1).

In some embodiments, scanning rangefinding apparatus 1200 is used to interact with a user who is viewing projected content. For example, a user may perform gestures or touch events within the field of view while interacting with projected content. In these embodiments, variable field of view controller 140 may modify angular extents, offsets, pulse power, and/or frame period during the process of gesture recognition or touch event recognition.

Figure 13:
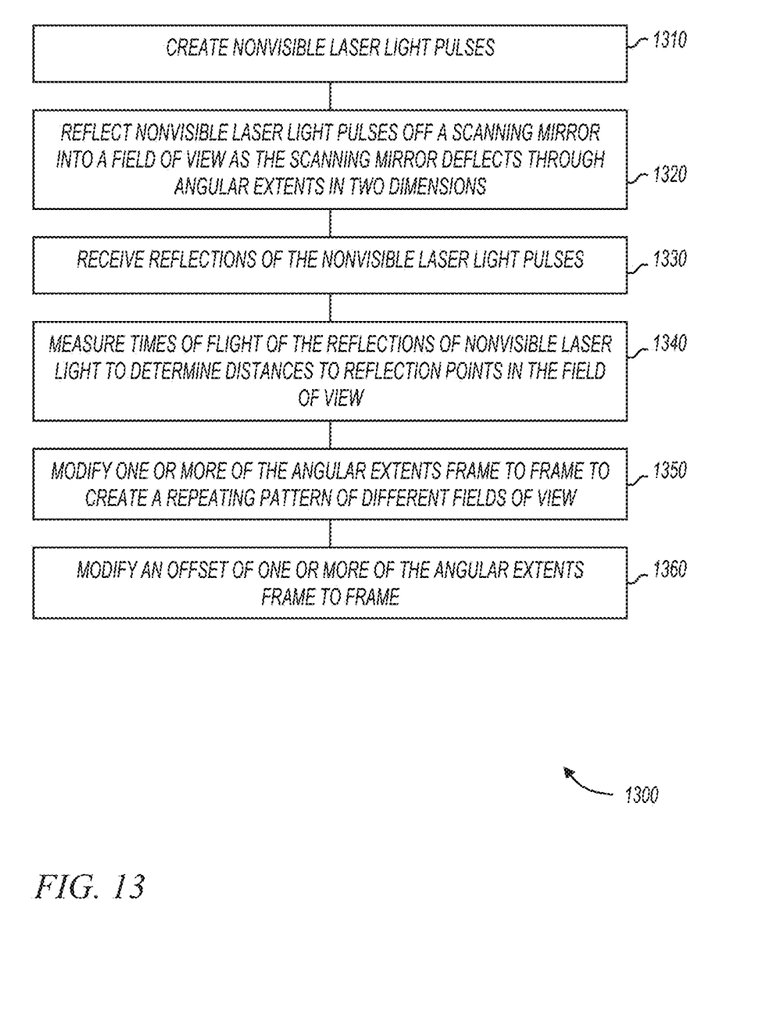
FIG. 13 shows a flow diagram of methods in accordance with various embodiments of the present invention.

FIG. 13 shows a flow diagram of methods in accordance with various embodiments of the present invention. In some embodiments, method 1300, or portions thereof, is performed by a variable field of view controller, embodiments of which are shown in previous figures. Further, in some embodiments, method 1300, or portions thereof, is performed by a scanning rangefinding system, embodiments of which are shown in previous figures. In other embodiments, method 1300 is performed by a series of circuits or an electronic system. Method 1300 is not limited by the particular type of apparatus performing the method. The various actions in method 1300 may be performed in the order presented, or may be performed in a different order. Further, in some embodiments, some actions listed in FIG. 13 are omitted from method 1300.

Method 1300 is shown beginning with block 1310. As shown at 1310, nonvisible laser light pulses are created. This may correspond to pulse drive circuit 102 commanding nonvisible laser light source 108 to generate infrared laser light pulses. At 1320, the nonvisible laser light pulses are reflected off a scanning mirror into a field of view as the scanning mirror deflects through angular extents in two dimensions. This may correspond to the laser light pulses being reflected off mirror 162 (FIG. 1) or off mirrors 1210 and 1220 (FIG. 12) into a field of view as shown in FIGS. 5, 8, and 10.

At 1330, reflections of the nonvisible laser light pulses are received. This may correspond to PD 184 receiving reflections of the laser light pulses created at 1310 and reflected off reflection points in the field of view.

At 1340, the times of flight of the reflections of nonvisible laser light pulses are measured to determine distances to reflection points within the field of view. This may correspond to TOF detection circuit 170 measuring the TOF of the reflected laser light pulses.

At 1350, one or more of the angular extents of mirror deflection are modified frame to frame to create a repeating pattern of different fields of view, and at 1360, an offset of one or more of the angular extents is modified frame to frame. In some embodiments, this corresponds to creating two fields of view and alternating between those two fields of view every other frame. In other embodiments, this corresponds to creating three or more different fields of view, and cycling through the three or more different fields of view in successive frames.

In some embodiments, the angular extents, offset, pulse power, and/or frame period are modified in response to measured distances to reflection points in the field of view. For example, in an automotive application, the field of view may be modified when an object is detected in the path of the automobile. Also for example, in an interactive projection application, the field of view may be modified while performing gesture recognition and/or touch event recognition.

Figure 14:
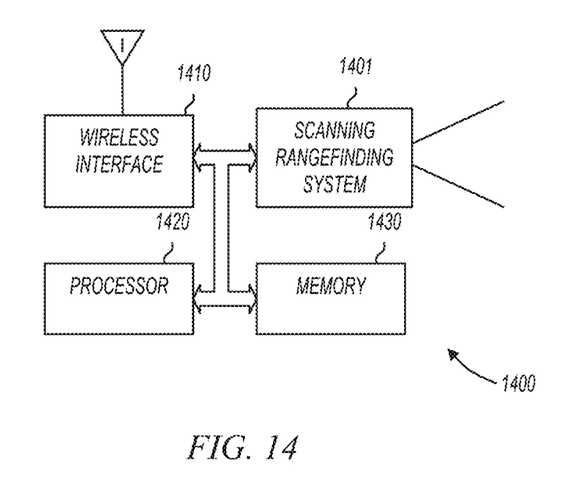
FIG. 14 shows a block diagram of a mobile device in accordance with various embodiments of the present invention.

FIG. 14 shows a block diagram of a mobile device in accordance with various embodiments of the present invention. As shown in FIG. 14, mobile device 1400 includes wireless interface 1410, processor 1420, memory 1430, and scanning rangefinding system 1401. Scanning rangefinding system 1401 may include any of the scanning rangefinding system described herein. For example, scanning rangefinding system 1401 may dynamically modify angular extents, offsets, pulse power levels, and/or frame periods as described above.

In some embodiments, scanning rangefinding system 1401 may include projection functionality. For example, in some embodiments, scanning rangefinding system 1401 includes a scanning laser projector as described above with reference to FIG. 12.

Scanning rangefinding system 1401 may receive image data from any image source. For example, in some embodiments, scanning rangefinding system 1401 includes memory that holds still images. In other embodiments, scanning rangefinding system 1401 includes memory that includes video images. In still further embodiments, scanning rangefinding system 1401 displays imagery received from external sources such as connectors, wireless interface 1410, a wired interface, or the like.

Scanning rangefinding system 1401 may provide depth map information to other devices. For example, scanning rangefinding system 1401 may provide depth map information to other devices using wireless interface 1410.

Wireless interface 1410 may include any wireless transmission and/or reception capabilities. For example, in some embodiments, wireless interface 1410 includes a network interface card (NIC) capable of communicating over a wireless network. Also for example, in some embodiments, wireless interface 1410 may include cellular telephone capabilities. In still further embodiments, wireless interface 1410 may include a global positioning system (GPS) receiver. One skilled in the art will understand that wireless interface 1410 may include any type of wireless communications capability without departing from the scope of the present invention.

Processor 1420 may be any type of processor capable of communicating with the various components in mobile device 1400. For example, processor 1420 may be an embedded processor available from application specific integrated circuit (ASIC) vendors, or may be a commercially available microprocessor. In some embodiments, processor 1420 provides image or video data to scanning rangefinding system 1401, and in other embodiments, processor 1420 provides depth map data received from scanning rangefinding system 1401 to other external devices. The image or video data may be retrieved from wireless interface 1410 or may be derived from data retrieved from wireless interface 1410. For example, through processor 1420, scanning rangefinding system 1401 may display images or video received directly from wireless interface 1410. Also for example, processor 1420 may provide overlays to add to images and/or video received from wireless interface 1410, or may alter stored imagery based on data received from wireless interface 1410 (e.g., modifying a map display in GPS embodiments in which wireless interface 1410 provides location coordinates).

Figure 15:
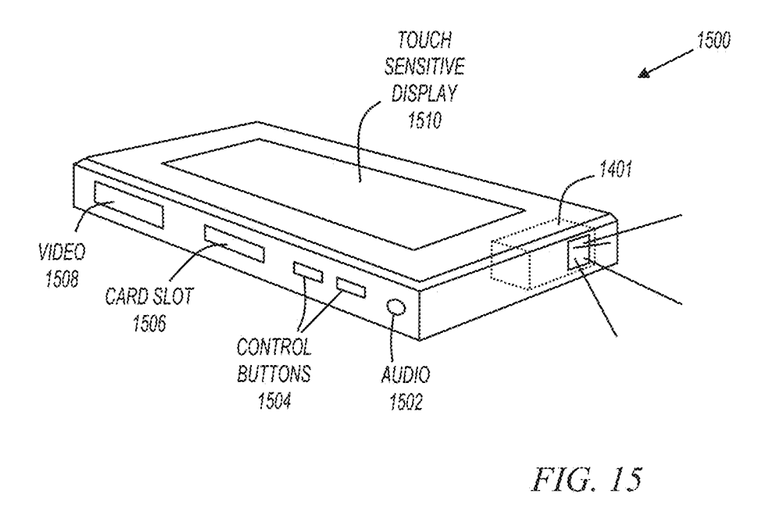
FIG. 15 shows a mobile device in accordance with various embodiments of the present invention.

FIG. 15 shows a mobile device in accordance with various embodiments of the present invention. Mobile device 1500 may be a hand held scanning rangefinding system with or without communications ability. For example, in some embodiments, mobile device 1500 may be a scanning rangefinding system with little or no other capabilities. Also for example, in some embodiments, mobile device 1500 may be a device usable for communications, including for example, a cellular phone, a smart phone, a tablet computing device, a global positioning system (GPS) receiver, or the like. Further, mobile device 1500 may be connected to a larger network via a wireless (e.g., cellular), or this device can accept and/or transmit data messages or video content via an unregulated spectrum (e.g., WiFi) connection.

Mobile device 1500 includes scanning rangefinding system 1401, touch sensitive display 1510, audio port 1502, control buttons 1504, card slot 1506, and audio/video (A/V) port 1508. None of these elements are essential. For example, mobile device 1500 may only include scanning rangefinding system 1401 without any of touch sensitive display 1510, audio port 1502, control buttons 1504, card slot 1506, or A/V port 1508. Some embodiments include a subset of these elements. For example, an accessory rangefinder may include scanning rangefinding system 1401, control buttons 1504 and display 1510. A smartphone embodiment may combine a cellular telephone and scanning projector functionality.

Touch sensitive display 1510 may be any type of display. For example, in some embodiments, touch sensitive display 1510 includes a liquid crystal display (LCD) screen. In some embodiments, display 1510 is not touch sensitive. Display 1510 may or may not always display the image projected by scanning rangefinding system 1401. For example, an accessory product with projection functionality may always display the projected image on display 1510, whereas a mobile phone embodiment with projection functionality may project a video while displaying different content on display 1510. Some embodiments may include a keypad in addition to touch sensitive display 1510.

A/V port 1508 accepts and/or transmits video and/or audio signals. For example, A/V port 1508 may be a digital port, such as a high definition multimedia interface (HDMI) port that accepts a cable suitable to carry digital audio and video data. Further, A/V port 1508 may include RCA jacks to accept or transmit composite inputs. Still further, A/V port 1508 may include a VGA connector to accept or transmit analog video signals. In some embodiments, mobile device 1500 may be tethered to an external signal source through A/V port 1508, and mobile device 1500 may project content accepted through A/V port 1508. In other embodiments, mobile device 1500 may be an originator of content, and A/V port 1508 is used to transmit content to a different device.

Audio port 1502 provides audio signals. For example, in some embodiments, mobile device 1500 is a media recorder that can record and play audio and video. In these embodiments, the video may be projected by scanning rangefinding system 1401 and the audio may be output at audio port 1502.

Mobile device 1500 also includes card slot 1506. In some embodiments, a memory card inserted in card slot 1506 may provide a source for audio to be output at audio port 1502 and/or video data to be projected by scanning rangefinding system 100. In some embodiments, depth map data is stored on a memory card in card slot 1506. Card slot 1506 may receive any type of solid state memory device, including for example secure digital (SD) memory cards.

Figure 16:
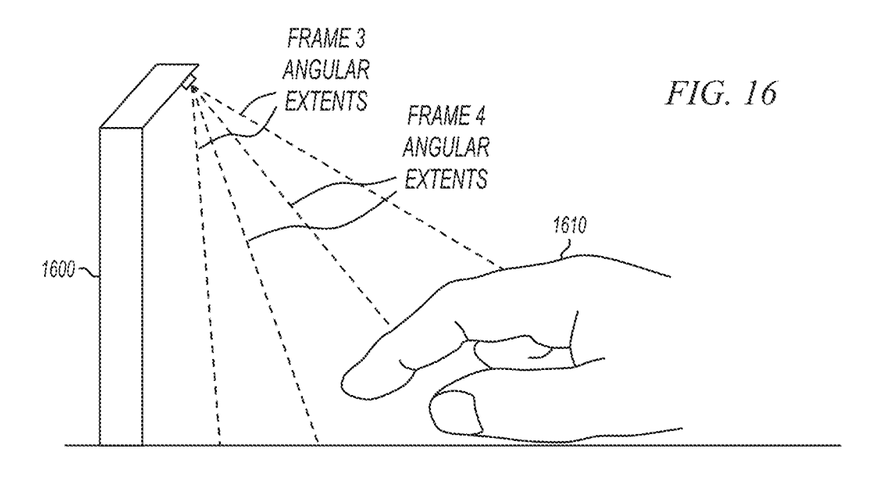
FIG. 16 shows an interactive rangefinding system in accordance with various embodiments of the present invention.

FIG. 16 shows an interactive scanning rangefinding system in accordance with various embodiments of the present invention. Interactive scanning rangefinding system 1600 may include any of the scanning rangefinding systems described herein. For example, in some embodiments, interactive scanning rangefinding system 1600 includes scanning rangefinding system 100 without projection functionality. Also for example, in some embodiments, interactive scanning rangefinding system 1600 includes projection functionality as described above with reference to FIG. 12.

In operation, interactive scanning rangefinding system 1600 modifies the field of view from frame to frame and may also modify pulse power levels and frame periods from frame to frame. Interactive scanning rangefinding system 1600 may detect an object such as human hand 1610 in the field of view, and then modify angular extents, offsets, pulse power levels, and/or frame periods in response. For example, the angular extents for FRAME 3 may be used to detect the object, and the angular extents for FRAME 4 may be modified to increase reflection point density in the vicinity of the fingertip for gesture recognition and touch event recognition.

Figure 17:
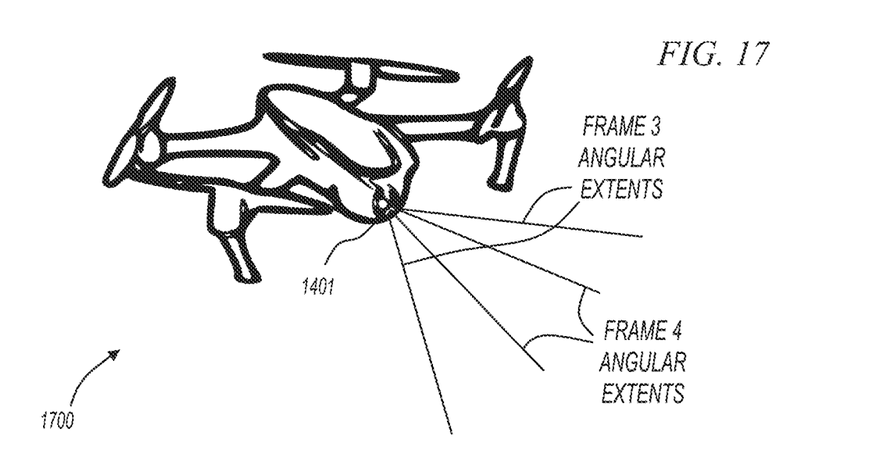
FIG. 17 shows a drone in accordance with various embodiments of the present invention.

FIG. 17 shows a drone in accordance with various embodiments of the present invention. Drone 1700 includes scanning rangefinding system 1401. In operation, drone 1700 may modify angular extents, offsets, pulse power, and/or frame periods to adaptively modify the field of view from frame to frame based on objects detected in the field of view. For example, drone 1700 may detect an object in the sky or on the ground, and modify the field of view to increase the density of reflection points in an area around the object.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning rangefinding system comprising:
 a first laser light source to emit nonvisible laser light pulses;
 a scanning mirror to reflect and scan the nonvisible laser light pulses in a field of view;
 a photodetector to detect reflections of nonvisible laser light pulses from a plurality of reflection points within the field of view;
 a time-of-flight (TOF) detection circuit responsive to the photodetector to measure distances from the scanning rangefinding system to the plurality of reflection points and detect an object within the field of view;
 a mirror actuating circuit to drive the scanning mirror with signals that cause the scanning mirror to deflect through angular extents in at least one of two dimensions to scan the laser light pulses on scan trajectories in frames; and
 a control circuit to drive the mirror actuating circuit, the control circuit responsive to the TOF detection circuit and the detection of the object to modify the angular extents of deflection of the scanning mirror in the at least one of the two dimensions frame to frame to periodically reduce the field of view and increase a resolution of the plurality of reflection points in a vicinity of the object such that at least some frames have different fields of view and higher resolution in the vicinity of the object.

2. The scanning rangefinding system of claim 1 wherein the control circuit drives the mirror actuating circuit to modify the angular extents of deflection of the scanning mirror in at least one of the two dimensions frame to frame to periodically reduce the field of view and increase the resolution of the plurality of reflection points in the vicinity of the detected object such that at least some frames have different fields of view by modifying the angular extents in a frame to frame repeating pattern.

3. The scanning rangefinding system of claim 1 wherein the control circuit drives the mirror actuating circuit to modify the angular extents of deflection of the scanning mirror in the at least one of two dimensions frame to frame to periodically reduce the field of view and increase the resolution of the plurality of reflection points in the vicinity of the detected object by modifying an offset to the angular extents of deflection.

4. The scanning rangefinding system of claim 3 wherein the control circuit drives the mirror actuating circuit to modify the angular extents of deflection to have a first offset in a first frame, and a second offset in a second frame.

5. The scanning rangefinding system of claim 4 wherein the first and second offsets alternate from frame to frame.

6. The scanning rangefinding system of claim 1 wherein the control circuit drives the mirror actuating circuit to modify a frame period to change from frame to frame.

7. The scanning rangefinding system of claim 1 wherein the control circuit controls the first laser light sources to modify a power level of the nonvisible light pulses.

8. The scanning rangefinding system of claim 1 wherein the control circuit drives the mirror actuating circuit to cause the scanning mirror to deflect through first angular extents in a first frame and to deflect through second angular extents in a second frame.

9. The scanning rangefinding system of claim 8 wherein the first and second angular extents alternate from frame to frame.

10. The scanning rangefinding system of claim 1 wherein the first laser light source comprises an infrared laser light source.

11. A scanning rangefinding system comprising:
 a pulsed light source to create laser light pulses;
 at least one scanning mirror to reflect the laser light pulses into a field of view as the at least one scanning mirror is deflected with variable angular extents and variable offset; and
 a time-of-flight (TOF) detection circuit to detect reflections of the laser light pulses from a plurality of reflection points in the field of view to detect an object within the field of view;

a control circuit, the control circuit responsive to the TOF detection circuit and the detection of the object to selectively modify the variable angular extents and variable offset of the at least one scanning mirror frame to frame to periodically reduce the field of view and increase a resolution of the plurality of reflection points in a vicinity of the object such that at least some frames have different fields of view and higher resolution in the vicinity of the object.

12. The scanning rangefinding system of claim 11 wherein the control circuit selectively modifies the variable angular extents and variable offset of the at least one scanning mirror frame to frame to periodically reduce the field of view and increase the resolution of the plurality of reflection points in the vicinity of the object to create a repeating pattern of different fields of view.

13. The scanning rangefinding system of claim 11 wherein the control circuit selectively modifies the variable angular extents and variable offset of the at least one scanning mirror frame to frame to periodically reduce the field of view and increase the resolution of the plurality of reflection points in the vicinity of the object to create an alternating pattern of different fields of view.

14. The scanning rangefinding system of claim 11 wherein the at least one scanning mirror comprises a first scanning mirror to deflect in a first dimension and a second scanning mirror to deflect in a second dimension.

15. A method comprising:

creating nonvisible laser light pulses;

reflecting the nonvisible laser light pulses off a scanning mirror into a field of view as the scanning mirror deflects through angular extents in two dimensions;

receiving reflections of the nonvisible laser light;

measuring a time-of-flight (TOF) of the reflections of nonvisible laser light to determine distances to reflection points in the field of view and detect an object within the field of view; and responsive to the measured TOF and the detection of the object, modifying one or more of the angular extents of the scanning mirror deflection frame to frame to periodically reduce the field of view and increase a resolution of the plurality of reflection points in a vicinity of the object such that at least some frames have different fields of view and higher resolution in the vicinity of the object.

16. The method of claim 15 further comprising, responsive to the measured TOF and the detection of the object, modifying an offset of the scanning mirror deflection frame to frame to periodically reduce the field of view and increase the resolution of the plurality of reflection points in the vicinity of the object such that at least some frames have different fields of view and higher resolution in the vicinity of the object.

17. The method of claim 15 further comprising modifying a frame period frame to frame.

18. The method of claim 15 further comprising modifying a power level of the nonvisible laser light pulses frame to frame.

19. The method of claim 15 wherein creating nonvisible laser light pulses comprises creating infrared laser light pulses.

* * * * *